US005302930A

United States Patent [19]

Brehm et al.

[11] Patent Number: 5,302,930

[45] Date of Patent: Apr. 12, 1994

[54] ELECTROMAGNETIC VALVE

[75] Inventors: Werner Brehm, Hemmingen; Kurt Gensheimer, Bad Liebenzell; Bernd Groll, Ingersheim; Erwin Krimmer, Pluederhausen, all of Fed. Rep. of Germany

[73] Assignee: Robert Bosch GmbH, Stuttgart, Fed. Rep. of Germany

[21] Appl. No.: 37,081

[22] Filed: Mar. 25, 1993

Related U.S. Application Data

[63] Continuation of Ser. No. 872,633, Apr. 22, 1992.

[30] Foreign Application Priority Data

Jul. 8, 1991 [DE] Fed. Rep. of Germany ....... 4122517

[51] Int. Cl.[5] .......................... H01F 7/00; H01F 3/00; F16K 31/02

[52] U.S. Cl. .................................... 335/278; 335/255; 251/129.15

[58] Field of Search ............... 337/278, 255, 258, 260, 337/261; 251/129.21, 129.15

[56] References Cited

U.S. PATENT DOCUMENTS 4,830,332 5/1989 Miura et al. .................... 251/129.15

*Primary Examiner*—Harold Broome

*Attorney, Agent, or Firm*—Michael J. Striker

[57] ABSTRACT

An electromagnetic valve has a housing, a coil having a coil body and arranged in the housing, a pole element, a flux conducting element, a magnet armature cooperating with the coil body through the pole element and the flux conducting element. The flux conducting element is bracket shaped and arranged for position-accurate fixing and mounting of the coil, the coil body, and the pole element in the housing.

12 Claims, 2 Drawing Sheets

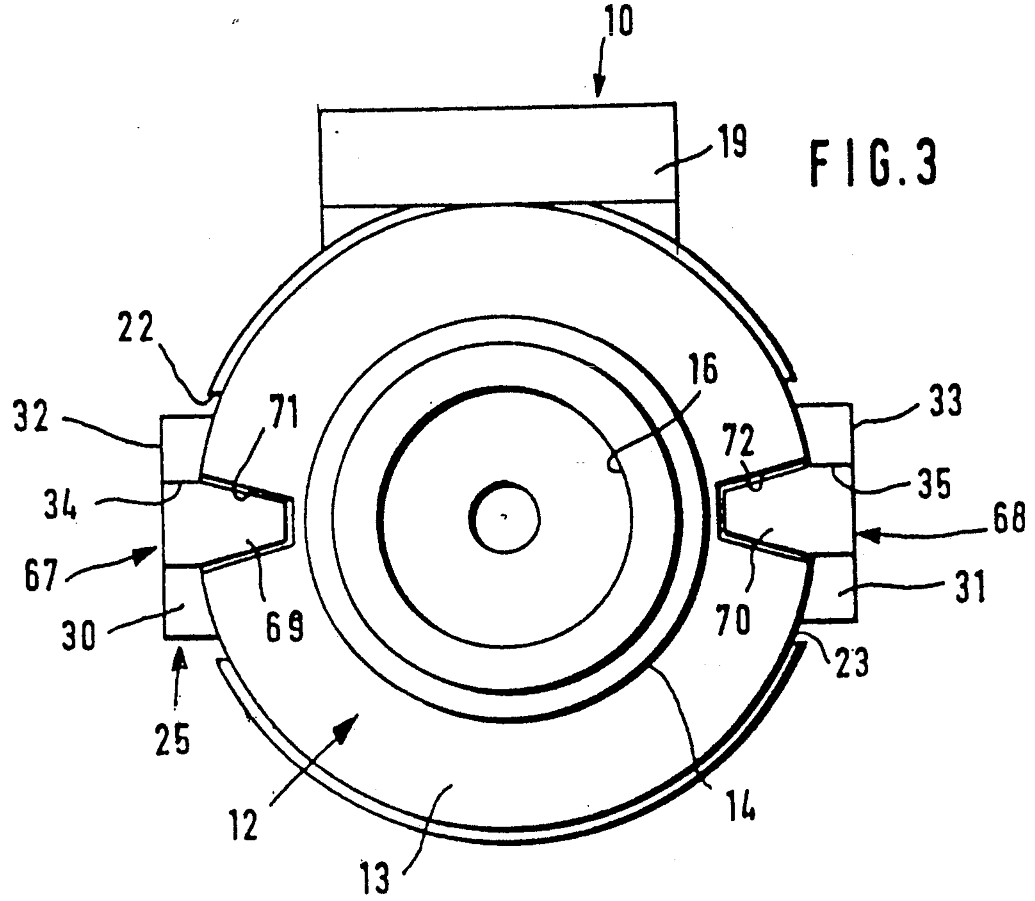
FIG. 3
FIG. 4
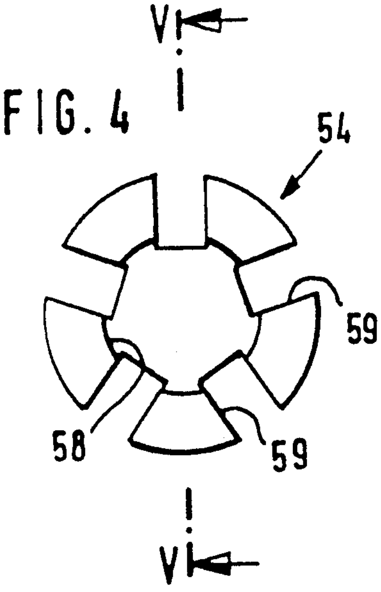
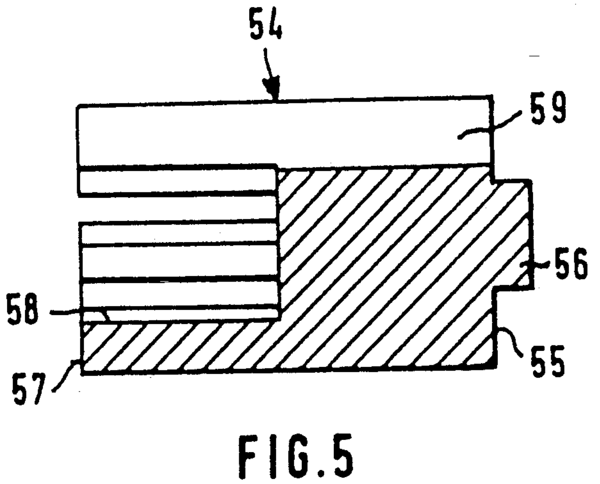
FIG. 5

ELECTROMAGNETIC VALVE

This is a continuation of application Ser. No. 872,633 filed Apr. 22, 1992.

BACKGROUND OF THE INVENTION

The present invention relates to an electromagnetic valve. More particularly, it relates to an electromagnetic valve which has a housing, a coil arranged in the housing and having a coil body cooperating with a magnet armature through a pole element and a flux guiding element.

Such valves are known in different forms and used for example in automatic transmissions for motor vehicles. In known valves the housing and/or the flux guiding element or the magnetic armature are produced in expensive material-removing working processes. It is also known to premount individual structural elements of such valves and to complete the final mounting by expensive connection processes, such as wobble riveting, ultrasound welding, flanging and others which are complicated in practice.

SUMMARY OF THE INVENTION

Accordingly, it is an object of the present invention to provide an electromagnetic valve of the above mentioned general type, which avoids the disadvantages of the prior art.

More particularly, it is an object of the present invention to provide an electromagnetic valve which can be produced in a price favorable and simple manner so that in particular material removing processes can be dispensed with.

In keeping with these objects and with others which will become apparent hereinafter, one feature of the present invention resides, briefly stated, in an electromagnetic valve of the above mentioned type in which a flux guiding element is substantially bracket-shaped and serves for position-accurate fixing and mounting of the coil, the coil body and the pole element in the housing.

When the electromagnetic valve is designed in accordance with the present invention, it eliminates the disadvantages of the prior art and achieves the above specified objects so there is no more complicated and expensive material-removing process involved. Moreover, the end mounting or end connection of the individual structural elements can be performed by a simple bending.

In accordance with another feature of the present invention, the housing of the valve is substantially bucket shaped and its open end side is closed by a closing surface of the coil body.

Still another feature of the present invention is that the flux guiding element at least partially embraces the closing surface of the coil body and the housing.

In accordance with still another feature of the present invention the flux guiding element has two guiding legs with bent portions abutting against the outer side of the bottom of the housing.

Furthermore, the pole element can abut against the inner side of the bottom of the housing.

The housing and the coil body together with the closing surfaces can be composed of a synthetic plastic material.

The magnetic armature of the electromagnetic valve can be guided directly in the interior of the coil body.

The flux guiding element and the pole element can be formed as punched-out parts.

Finally, the magnetic armature can be composed of a sintered material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a front view of the electromagnetic valve;

FIG. 4 is a view showing the magnet armature of the inventive electromagnetic valve; and FIG. 5 is a view showing a section taken along the line V—V of FIG. 4.

DESCRIPTION OF THE PREFERRED EMBODIMENT

Figure 1:
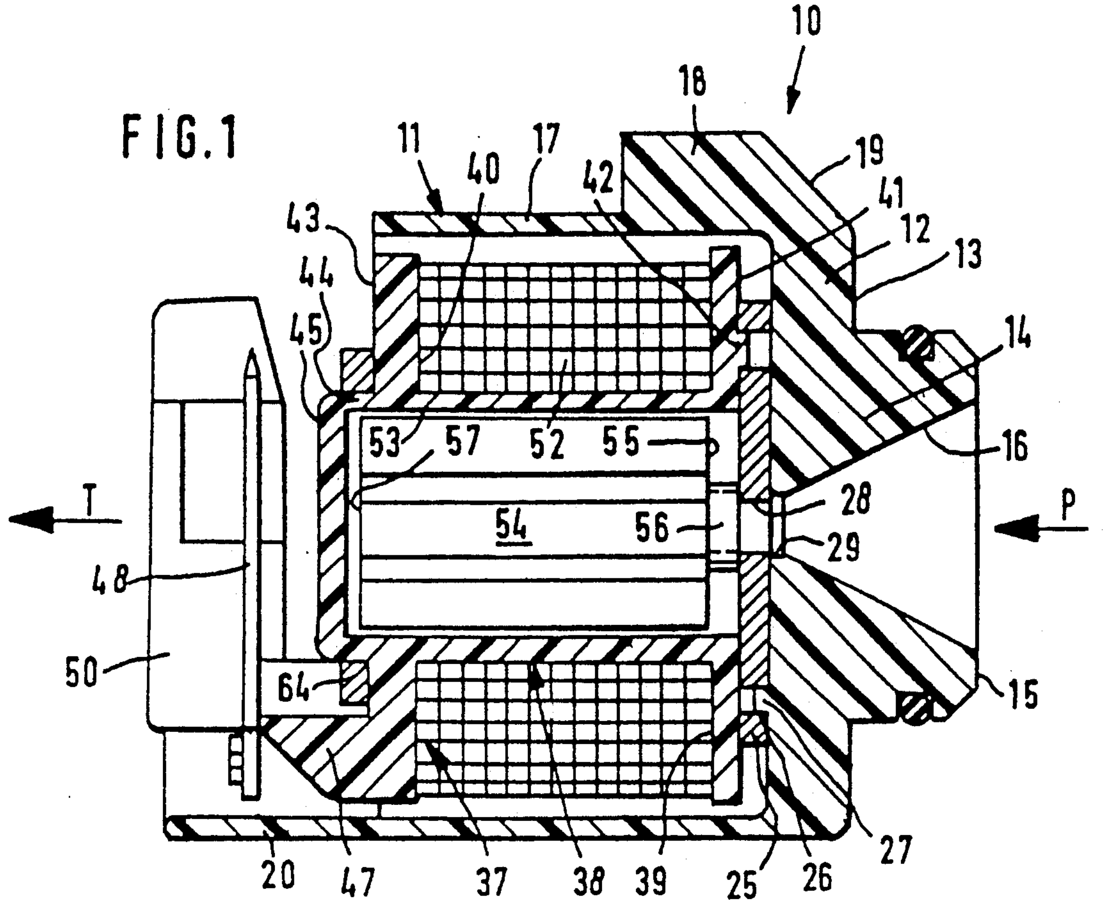
FIG. 1 is a view showing a longitudinal section of an electromagnetic valve.
Figure 2:
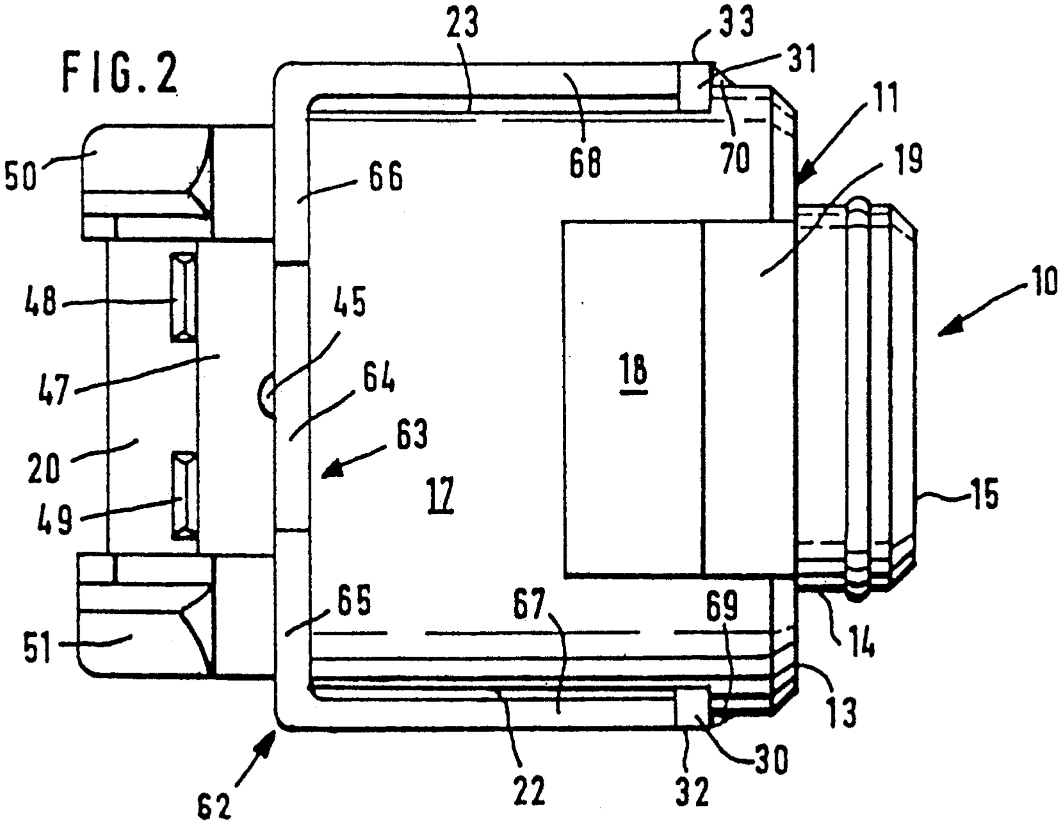
FIG. 2 is a side view of the electromagnetic valve of FIG. 1.

An electromagnetic valve in accordance with the present invention is identified in FIGS. 1-3 with reference numeral 10. It has a substantially bucket-shaped shaped housing 11 with a bottom 12 provided on its lower side 13 with a cylindrical projection 14. A conical depression 16 extends from the free end side 15 of the projection 14 and opens into the interior of the housing. A substantially parallelepiped-shaped projection 18 is arranged near the bottom 12 on the outer periphery of an outer surface 17 of the housing 10. It has an inclined edge 19 which is used for mounting and also as an abutment for the electromagnetic valve 10 against a mounting structure.

The outer surface 17 of the housing 11 has a side which is opposite to the projection 18. The opposite side of the outer surface 17 is lengthened by a projection 20 which extends from the bottom 12 of the housing. Two substantially rectangular recesses 22 and 23 are formed in the outer surface 17 located opposite to one another. One extends from the open end side of the housing 11 to the bottom 12.

A pole piece 25 is inserted in the interior of the housing 11 and abuts against the bottom of the housing. For position-accurate arrangement it is provided with four openings 26 which are offset relative to one another by approximately 90° and located near the outer periphery.

Guiding projections 27 of the bottom 12 of the housing 11 are offset relative to one another by approximately 90° and extend into the openings 26.

The pole disc also has a throughgoing central opening 28 coinciding with an opening 29 of the depression 16. The side of the opening 28 which is opposite to the bottom 12 serves as a valve seat of the electromagnetic valve. The pole disc 25 is provided at two opposite sides with holding projections 30 and 31. The guiding grooves 34 and 35 are formed in the outer sides 32 and 33 of the holding projections 30 and 31.

A not shown sealing ring is preferably arranged between the bottom 12 and the pole disc 25 for sealing the opening 29 of the depression 16 or the opening 28. The sealing ring is inserted into a not shown ring-shaped depression in the bottom 12 of the housing 11.

A winding element 37 is inserted into the interior of the housing 11. It has a hollow cylindrical coil body 38 with both end sides provided with ring-shaped closing surfaces 39 and 40. Two guiding pins 42 which are offset relative to one another by 90° are mounted on the outer side 41 of the closing surface 39 facing the pole disc 35. The guiding pins 42 coincide with two free openings 26 in the pole piece 25 and are correspondingly offset relative to the guiding projection 27 in the bottom 12.

A ring-shaped guiding projection 44 extends on the outer side 43 of the closing surface 40. Its inner diameter corresponds to the diameter of the coil body 38. A small elongated web 45 extends substantially radially on the free surface of the guiding projection 44 and is connected with the guiding projection 44 in two diametrically arranged points.

A transverse web 47 which receives two connecting contacts 48 and 49 extends on the outer side 43 of the closing surface 40 in the region of the projection 20 and substantially perpendicularly to the web 45 at a distance from it. Closure legs 50 and 51 extend on the outer side of the transverse web 47 near the closing contact 48 and 49 at a distance to the closing surface 40. They are parallel to the closing contacts 48 and 49 and the web 45. A coil 59 is wound on the coil body 38 between the closure surfaces 39 and 40 and contacts with the closing contacts 48 and 49.

A substantially cylindrical magnet armature 45 is slidingly guided in the inner chamber 53 of the coil body 38. The magnet armature 54 shown in FIGS. 4 and 5 has a cylindrical projection 56 which cooperates with the opening 28 or the valve seat. An axial opening 58 extend from the opposite end side 57 and substantially to the center of the magnet armature. Five longitudinal axial slots 59 which are uniformly distributed over the periphery are provided on the outer periphery of the magnet armature 54. They extend over the whole length of the magnet armature into the direction of the opening 58 to this opening. The stroke of the magnet armature 57 in the inner chamber 53 of the coil 38 is limited on the one hand by the pole disc 25 and on the other hand by the web 45.

The winding element 37 and the housing 11 are connected with one another by a substantially U-shaped flux guiding bracket 62. A transverse web 63 of the flux guiding bracket includes a guiding ring 64 which embraces the guiding projection 44 and two opposite web portions 65 and 66 with guiding legs 67 and 68 extending substantially perpendicularly from them. The guiding legs 67 and 68 extend in the region of the openings 22 and 23 of the outer surface 17 of the housing 11 to the vicinity of the bottom 12. At their free ends they have portions 69 and 70 of a smaller width. These portions extend into the guiding grooves 34 and 35 in the holding projections of the pole disc 25. The portions 69 and 70 are bent inwardly substantially perpendicularly and extend into respective depressions 71 and 72 in the lower side 13 of the bottom 12.

The electromagnetic valve which is described in this example is formed as a 2/2 magnet valve. The depression 16 communicates with a not shown pressure source having a connecting P. In currentless condition the pressure medium flows through the depression 16 into the opening 28 in the pole disc 25 and acts on the projections 56 of the magnet armature 54. It is pressed under the pressure of building-up pressure against the web 45, so that the pressure medium flows into the inner chamber 53 of the coil body. Through the axial slot 59 and the opening 58 in the magnet armature, it can go through the inner chamber of the coil body on the web 35 into the not shown containers which has a connection T. Then a current flows through the coil 52 of the electromagnetic valve, the magnet armature 54 is moved under the action of the pressure to the pole disc 25 so that the projection 56 of the valve seat or the opening 28 is closed at one side. Thereby the communication between the pressure medium source P and the container T is interrupted.

For mounting of the electromagnetic valve in accordance with the present invention, the winding element 37 is inserted into the flux conducting bracket 62 so that the guiding projection 44 extends into the conducting ring 64. The magnet armature 54 is inserted into the interior 53 of the coil body 38, and the pole disc 26 is placed on the outer surface 69 so that the portions 69, 70 of the guiding legs 67, 68 extend into the guiding grooves 34, 35. Simultaneously the guiding pin 42 of the winding element 37 extends into the opening 26. The thusly premounted structural unit is then inserted into the interior of the housing so that the portions 69, 70 of the flux guiding bracket 62 is located in the region of the depressions 71 and 72 and the bottom 12 of the housing 11. The pole disc 26 abuts against the bottom 12 or the not shown sealing ring, and the guiding projection 27 extends in the free opening 26 of the pole disc 25. By bending of the portions 69, 70 by the depressions 71 and 72 a firm connection is obtained.

The housing 11 and the winding element 37 are formed as synthetic plastic injection molded parts. The closure contact 48, 49 are inserted in respective recesses in the transverse web 47. The pole disc 25 and the flux conducting bracket 62 are formed as punched-out or punch-bent parts. The magnet armature 54 is produced of a sintered material and guided without intermediate elements directly in the interior of the coil body. In a first variation of the inventive example the magnet armature can be also worked or produced with a material removal. The above described example of the electromagnetic valve is characterized by a low number of structural elements, simple manufacturing and premounting. In the shown example of the housing 11, by the projection 18 simultaneously an abutment and a mounting means is integrated. The projection 20 of the mounting surface 17 of the housing 11 also serves as protection of the guiding of the closure contact 48, 49.

In the shown example of the magnet armature, the pressure medium flows completely through the electromagnetic valve in its open condition. The pressure medium flow is neither deviated nor strongly braked so that the dirt particles contained in it are not enriched in the valve but instead rinsed almost completely to the tank. A dirtying or operation disturbance by deposit of mechanical dirt particles on the pressure means is therefore completely eliminate.

It will be understood that each of the elements described above, or two or more together, may also find a useful application in other types of constructions differing from the types described above.

While the invention has been illustrated and described as embodied in an electromagnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetic valve comprising a bucket-shaped housing; a coil having a coil body and arranged in said housing; a pole element; a flux conducting element; a magnet armature cooperating with said coil body through said pole element and said flux conducting element, said flux conducting element being formed as a substantially U-shaped bracket fixing and mounting of said coil, said coil body, and said pole element in said housing.

2. An electromagnetic valve as defined in claim 1, wherein said housing has an open side, said coil body having a closing surface which closes said open side of said housing.

3. An electromagnetic valve as defined in claim 2, wherein said flux conducting element at least partially embraces said closing surface of said coil body and also said housing.

4. An electromagnetic valve as defined in claim 1, wherein said flux conducting element has two guiding legs with bent portions, said housing having a bottom with an outside said bent portions abutting against said outside of said bottom of said housing.

5. An electromagnetic valve as defined in claim 1, wherein said housing has a bottom with an inner side, said pole element abuts against said inner side of said bottom.

6. An electromagnetic valve as defined in claim 2, wherein said housing and said coil body with said closing surface is composed of synthetic plastic material.

7. An electromagnetic valve as defined in claim 1, wherein said magnetic armature is guided directly in an interior of said coil body.

8. An electromagnetic valve as defined in claim 1, wherein said flux conducting element and said pole element are formed as punched parts.

9. An electromagnetic valve as defined in claim 1, wherein said magnet armature is composed of a sintered material.

10. An electromagnetic valve as defined in claim 1, wherein said housing is a one-piece housing.

11. An electromagnetic valve as defined in claim 1, wherein said housing has a peripheral wall with an outer side and a bottom provided at one axial end of said peripheral wall and having an outer side, said flux conducting element has a transverse web located at an opposite axial side and extending over said coil body located substantially between said transverse web of said flux conducting element and said bottom of said housing, said bent part of said flux conducting element including two legs extending over said outer side of said peripheral wall of said housing in an axial direction, and two projections provided at free ends of said legs abutting said outer side of said bottom of said housing.

12. An electromagnetic valve as defined in claim 11, wherein said pole element is located between said coil body and said bottom of said housing, said projections of said legs of said flux guiding element engaging with said pole element.

* * * * *